(12) United States Patent
Coatney

(10) Patent No.: US 6,748,510 B1
(45) Date of Patent: Jun. 8, 2004

(54) SYSTEM AND METHOD FOR VERIFYING DISK CONFIGURATION

(75) Inventor: Susan M. Coatney, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 130 days.

(21) Appl. No.: 10/086,755

(22) Filed: Feb. 28, 2002

(51) Int. Cl.[7] .............................................. G06F 12/00
(52) U.S. Cl. ..................... 711/170; 711/154; 711/112; 710/8
(58) Field of Search .......................... 711/170, 154, 711/112; 710/8

(56) References Cited

U.S. PATENT DOCUMENTS

| | | |
|---|---|---|
| 5,163,131 A | 11/1992 | Row et al. |
| 5,355,453 A | 10/1994 | Row et al. |
| 5,485,579 A | 1/1996 | Hitz et al. |
| 5,802,366 A | 9/1998 | Row et al. |
| 5,819,292 A | 10/1998 | Hitz et al. |
| 5,931,918 A | 8/1999 | Row et al. |
| 5,941,972 A | 8/1999 | Hoese et al. |
| 5,963,962 A | 10/1999 | Hitz et al. |
| 5,974,473 A | * 10/1999 | Leavitt et al. ................. 710/8 |
| 6,065,037 A | 5/2000 | Hitz et al. |
| 6,289,356 B1 | 9/2001 | Hitz et al. |
| 6,425,035 B2 | 7/2002 | Hoese et al. |

OTHER PUBLICATIONS

American National Standard for Information Technology, Fibre Channel Arbitrated Loop (FC–AL–2), Dec. 8, 1999, American National Standards Institute, Inc. all pages.

U.S. Pending patent application Ser. No. 09/933,866, filed Aug. 20, 2001, for an Operator Initiated Graceful Takeover in a Node Cluster by Samuel M. Cramer et al., all pages.

U.S. Pending patent application Ser. No. 10/092,007, filed Mar. 6, 2002, for a System and Method for Multipath I/O Support for Fibre Channel Devices by Anthony F. Aiello et al., all pages.

* cited by examiner

Primary Examiner—Kevin Verbrugge
Assistant Examiner—Mehdi Namazi
(74) Attorney, Agent, or Firm—Cesari and McKenna, LLP

(57) ABSTRACT

The present invention provides a system and method for verifying disconfigurations of file servers by performing a verification in real-time after any disk event which modifies the disk configuration. A disk verification layer of the storage operating system compares the updated disk topology and configuration with a set of rules associated with a particular file server configuration. If the disk topology or configuration is such that data loss or corruption can occur, the file server is halted. If the disk topology or configuration could be improved for higher availability an appropriate warning is issued to the user or administrator.

19 Claims, 9 Drawing Sheets

SYSTEM AND METHOD FOR VERIFYING DISK CONFIGURATION

FIELD OF THE INVENTION

The present invention pertains to file servers and more particularly to disk configurations of file servers.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

As used herein, the term "storage operating system" generally refers to the computer-executable code operable on a storage system that manages data access and client access requests and may implement file system semantics in implementations involving filers. In this sense, the Data ONTAP™ storage operating system, available from Network Appliance, Inc. of Sunnyvale, Calif., which implements a Write Anywhere File Layout (WAFL™) file system, is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity) partitions in a single disk) arranged according to a RAID 4, or equivalent high-reliability, implementation.

File servers can be configured in a variety of ways, including, for example as a regular file server with multiple data paths to disks, as a file server in a cluster of file servers or as a file server providing mirrored service to disks. In each of these configurations, the disk configuration, or actual physical wiring cabling of the disks, needs to be validated against certain standards and rules. As used herein "disk configuration" should be taken generally to mean the actual physical cabling of disks, disk shelves and file servers in a given file server implementation. Improper disk configurations can result in data corruption or data loss if a file server uses an improperly configured disk for I/O operations. Disks which are improperly cabled may function for a period of time, but can cause data corruption and/or other errors within a file server.

In known file server implementations, the disk configuration is verified once at file server boot time. However, any disks that were added to the disk configuration or any disk that had wiring changed after filer boot time are typically not reverified for a proper configuration. A noted disadvantage of this implementation is that an improper disk configuration could result from disks being added or reconnected after the filer boot time. This misconfiguration could cause data corruption with the misconfigured disk drives. Additionally, when the file server is eventually rebooted, the reinitialization often fails since the file server is unable to verify the disk configuration. As the reinitialization failure can occur weeks or months after the change in configuration, there is no readily apparent cause-and-effect with the configuration change. This lack of discernable cause-and-effect between configuration and failure hampers system administrators or users from detecting and correcting the misconfigured disk drives.

Another known implementation to verify the disk configuration of a file server involves scanning all disk drives once at boot time, and then periodically looping through all of the possible disk drives to verify continued configuration. A noted disadvantage of this technique is that disks can be moved or added in times that occur between the loops of the scanning. When a misconfiguration occurs in between scanning loops, the file server can not detect the misconfiguration until the next scanning loop. Data corruption or loss may result from the use of misconfigured disks in the interim. Scanning loops cause degradation in system performance due to increased processing overhead. By extending the time between scanning loops, improved system performance is achieved, but at a risk of data corruption. Similarly, by decreasing the time between loops, the risk of data corruption is lessened but at a significant cost of performance. Additionally, this methodology typically scans all possible disk drive slots, whether utilized by the file server or not. This results in a large processing overhead cost regardless of how few slots are actually employed by disks.

SUMMARY OF THE INVENTION

The disadvantages of the prior art are overcome by providing a system and method for verifying the disk configuration of a given computer, e.g., a file server by performing a real-time check of the configuration after each event that modifies the configuration of the disks. This check only involves actual connected disks and not empty slots.

The disk configuration verification functionality or layer of the storage operating system receives event verifications from the low-level disk driver. These event notifications alert the disk configuration verification layer to changes in the disk topology of disks connected to a particular file server. The disk verification layer compares the disk's configuration and topology to a set of rules defined for a given file server configuration. If the actual disk configuration can result in data loss or corruption in a given file server implementation, the disk configuration verification layer halts the file server and/or issues a warning to the user or administrator. A halt occurs if the configuration can lead to data loss or corruption. Additionally, warnings are issued if the configuration does not lead to data loss or corruption but is not an optimal configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Storage System Environment

Figure 1:
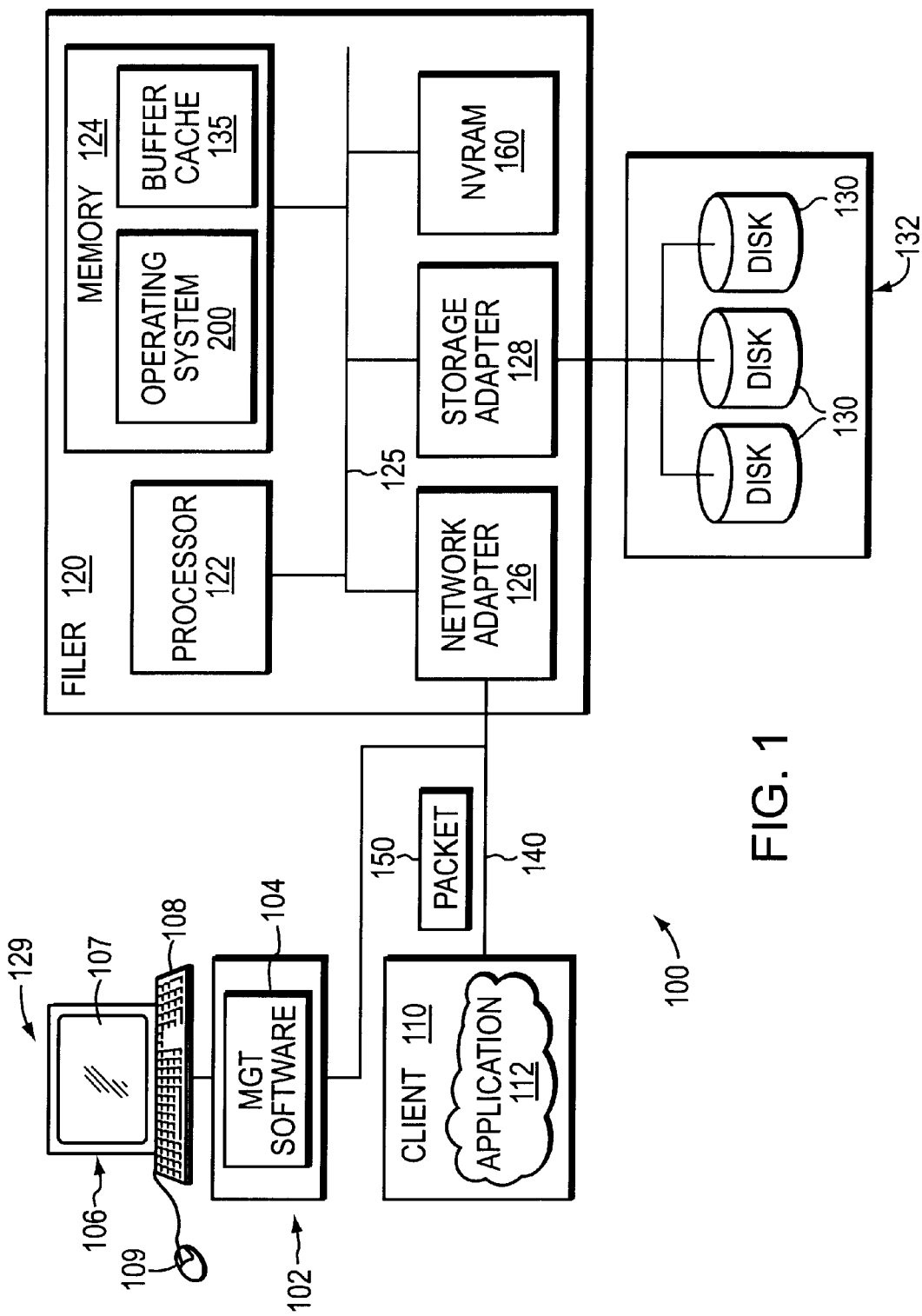
FIG. 1 is a schematic block diagram of a storage system environment including a file server.

By way of further background, FIG. 1 is a schematic block diagram of a storage system environment 100 that includes a client 110 having one or more applications 112, and an interconnected file server 120 that may be advantageously used with the present invention. The filer server or "filer" 120 is a computer that provides file service relating to the organization of information on storage devices, such as disks 130. It will be understood to those skilled in the art that the inventive technique described herein may apply to any type of special-purpose computer (e.g., server) or general-purpose computer, including a standalone computer. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks. A console or other user interface 129 is provided to control various filer functions, including those implemented according to this invention, and report on the status of filer operations.

It will be understood to those skilled in the art that the inventive technique described herein may apply to any type of special-purpose computer (e.g., file serving appliance) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130 of a disk shelf 132 that is attached, via the storage adapter 128 to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

In one exemplary filer implementation, the filer 120 can include a nonvolatile random access memory (NVRAM) 160 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

Connected to the LAN 140 may be a station using which a maintenance operator can interface with the system. A management station 102 can include a server or PC-based computer in a console 129 with a network interface for communicating over the LAN 140. Within the management station 102, resides appropriate management software 104. A graphical user interface (GUI) 106 may include a display 107, a keyboard 108 and a mouse 109 so that a maintenance operator can enter commands into the system.

In an illustrative embodiment, the disk shelf 132 is arranged as a plurality of separate disks 130. The disk shelf 132 may include, in some embodiments, dual connectors for redundant data paths. The disks 130 are arranged into a plurality of volumes, each having a file system associated therewith. The volumes each include one or more disks 130. In one embodiment, the physical disks 130 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

To facilitate generalized access to the disks 130 on the array 132, the storage operating system 200 (FIG. 2) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the storage operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
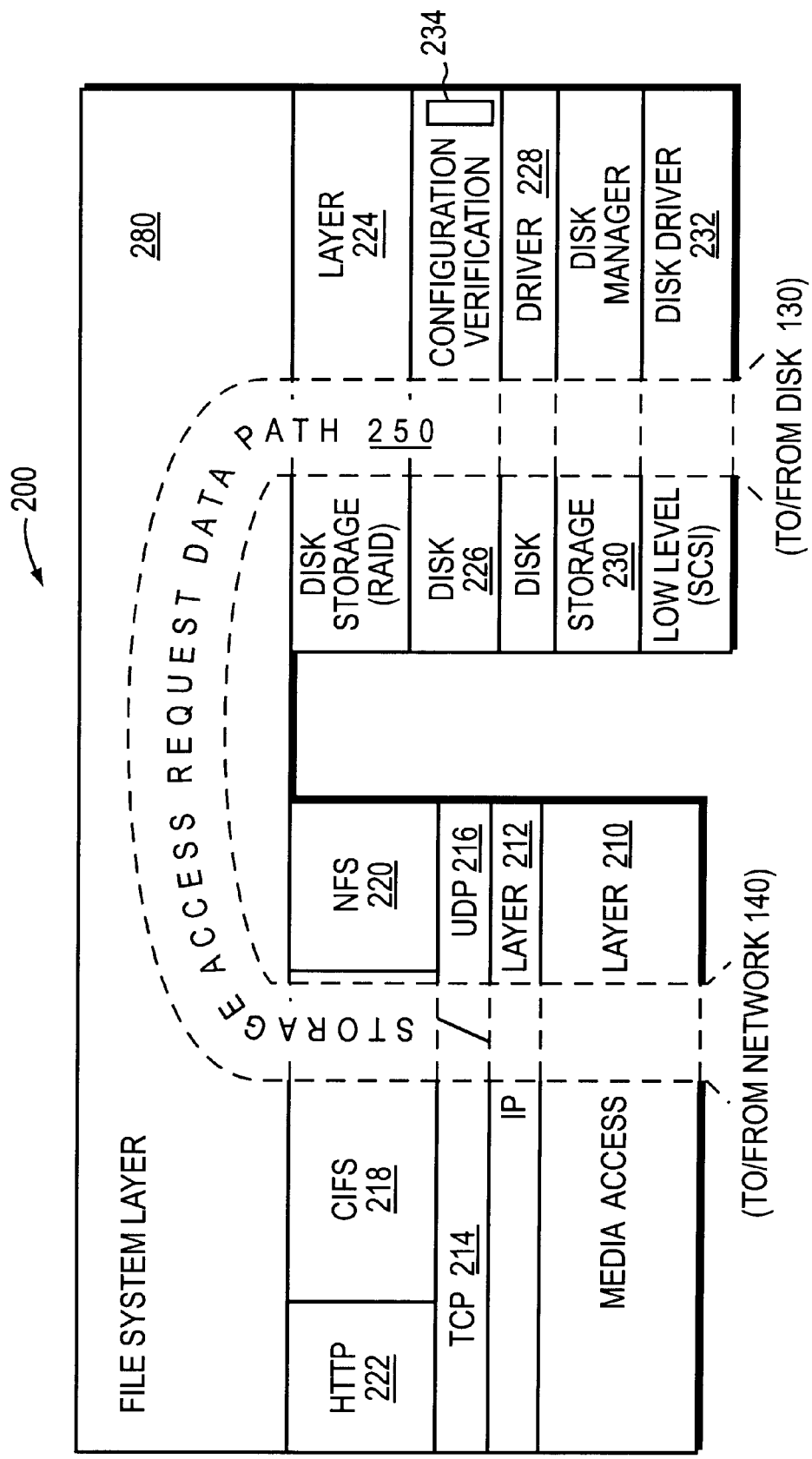
FIG. 2 is a schematic block diagram of an exemplary storage operating system for use with the illustrative file server of FIG. 1.

The organization of the preferred storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol, a disk configuration verification layer 226, a disk driver layer 228, a storage disk manager layer 230 and a low-level disk driver that implements a disk control protocol such as the small computer system interface (SCSI) 232. The disk configuration verification layer 226, described further below, performs the verification of the disk configuration utilizing information gathered by the storage disk manager and low level disk driver layers. The storage disk manager layer 230 (also described below) works to collect information regarding the paths to the various disks connected to the file server. This information can be utilized by the disk configuration verification layer 226.

Bridging the disk software layers with the network and file system protocol layers is a file system layer 280 of the storage operating system 200. Generally, the layer 280 implements a file system having an on-disk format representation that is block-based using, e.g., 4-kilobyte (KB) data blocks and using inodes to describe the files. In response to transaction requests, the file system generates operations to load (retrieve) the requested data from volumes 134 if it is not resident "in-core", i.e., in the filer's memory 124. If the information is not in memory, the file system layer 280 indexes into the inode file using the inode number to access an appropriate entry and retrieve a logical volume block number. The file system layer 280 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from volumes 134 and loads the requested data in memory 124 for processing by the filer 120. Upon completion of the request, the filer (and storage operating system) returns a reply, e.g., a conventional acknowledgement packet defined by the Common Internet File System (CIFS) specification, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110.

C. Filer Configurations

File servers can be configured in a variety of ways to best provide the file server's operations required for a given network environment. Each file server configuration should have a set disk configuration methodology to insure that data corruption or loss will not occur. Three common file server configurations are implemented:

(1) as a regular file server with multi-path data connections to the disk shelves;

(2) as a file server in a cluster of file servers utilizing a cluster interconnect; and (3) as a file server utilizing certain data/disk mirroring techniques.

Figure 3:
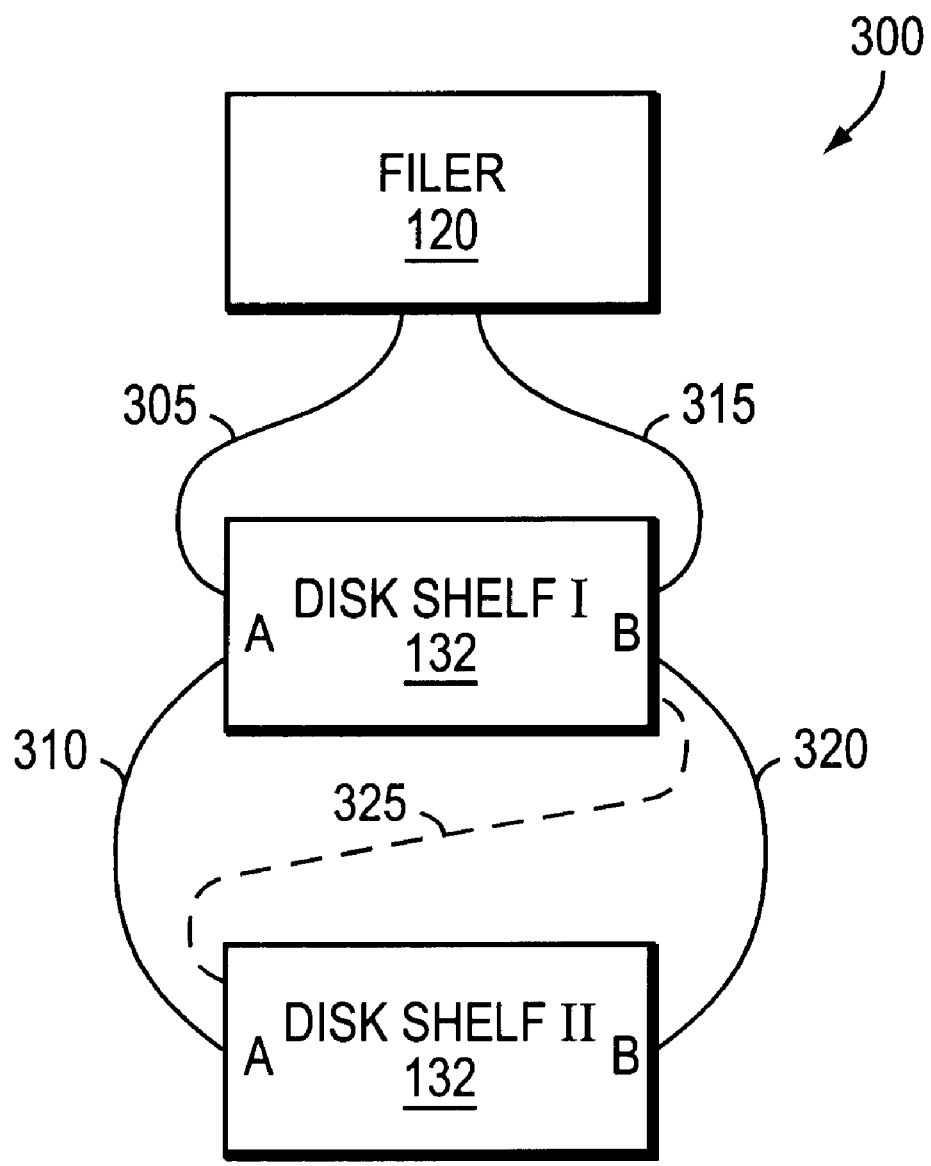
FIG. 3 is a schematic block diagram of an exemplary configuration of a file server and connected disk shelves.

FIG. 3 is a schematic block diagram of an exemplary file server configuration 300 of a regular file server utilizing multi-path connections to disk shelves. This configuration shows a filer 120 connected to two disk shelves via a variety of cabling. Disk shelf I and disk shelf II both have a A/B connections for multiple data paths to the disks comprising the disk shelf. In this exemplary environment 300, filer 120 is connected to the A connector of disk shelf I and disk shelf II via cables 305 and 310 respectively. Similarly, filer 120 is connected to the B connectors of disk shelf I and II via cables 315 and 320. An example of a rule that should be followed to prevent availability issues is that disk shelves should not be "cross-wired" from a B to a A, or vice versa. For example, cable 325 (shown as a dashed line), would be an example of a miswired configuration as it is connected to the B connector of disk shelf I and the A connector of disk shelf II. Note that the connections while representing as "cables" can be any appropriate physical connection including an internal bus or wireless connection.

Figure 4:
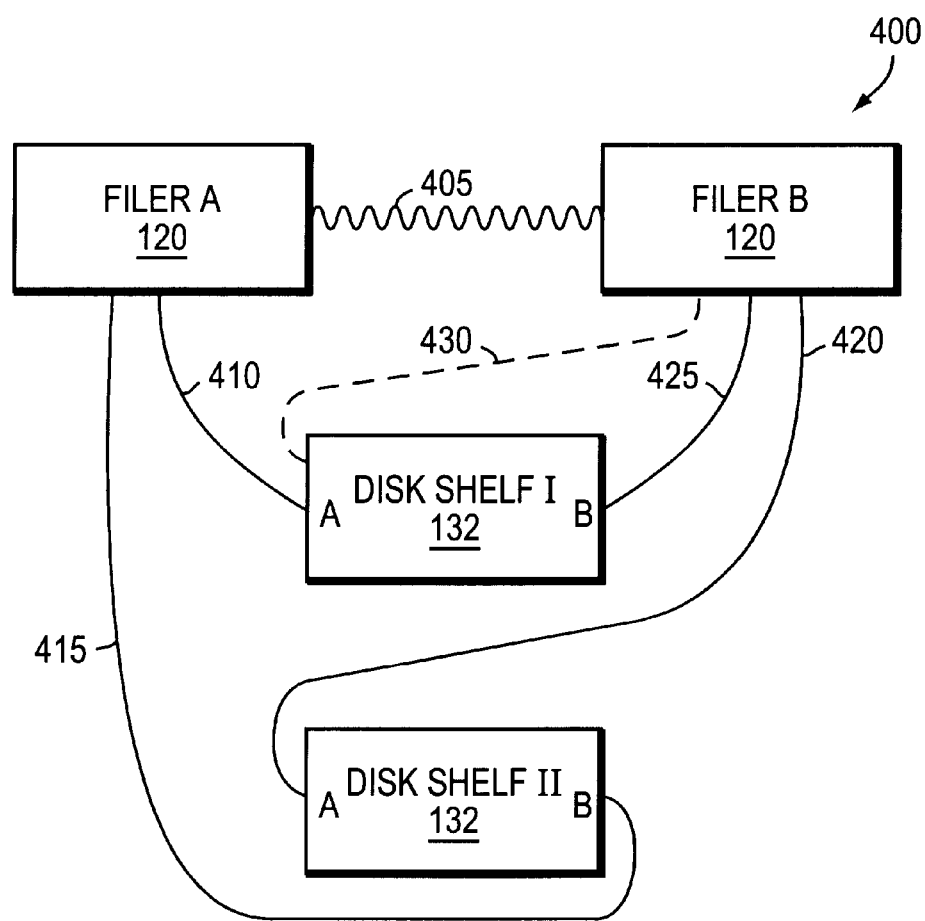
FIG. 4 is a schematic block diagram of an exemplary cluster of file servers and associated disk shelves.

FIG. 4 is an exemplary file server configuration 400 of two filers in a file server cluster. Filer A and filer B 120 are interconnected via a cluster interconnect 405. Such clusters are further described in U.S. patent application Ser. No. 09/933,866 entitled OPERATOR INITIATED GRACEFUL TAKEOVER IN A NODE CLUSTER by Samuel Cramer et al. In a typical file server cluster configuration, each file server is connected to the A connection of a disk shelf that is a particular file server is primarily responsible for servicing file service operation therefrom. Each filer is also connected to the B connection of a disk shelf that the file server is providing backup or failover file service operations therefrom. Thus, in this configuration 400, filer A 120 is connected to disk shelf I at the A connection via cabling 410 and to disk shelf II via its B connection via cabling 415. Similarly, filer B 120 is connected to disk shelf I at its B connection via cabling 425 and disk shelf II at its A connection via cabling 420. In this environment, as wired, filer A would "own" disk shelf I and provide backup service for disk shelf II. Similarly, filer B would "own" disk shelf II and provide backup service for disk shelf I. In reference to file servers in a cluster configuration, the term "own" generally means to be primarily responsible for servicing data access requests to the data stored on a disk. An example of a miswired or improper configuration is shown by wire (dashed line) 430, which is connected from filer B to the A connection of disk shelf I. In such a miswired configuration, both filer A and filer B could believe that they "own" disk shelf I. Data corruption and/or loss could result.

Figure 5:
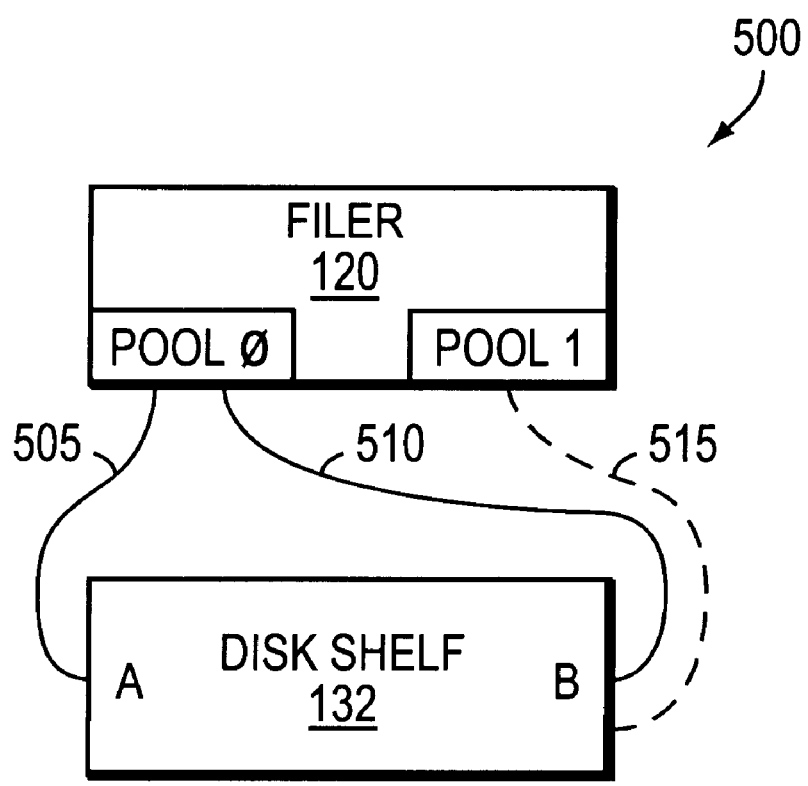
FIG. 5 is a schematic block diagram of an exemplary file server employing a disk mirroring environment.

FIG. 5 is an exemplary file server configuration 500 of a filer providing mirroring surface. Filer 120 has two pools of storage adapters, including Pool 0 and Pool 1. In certain mirroring configurations, a disk shelf must be connected via both its A and B connections to the same pool of storage adapters. Thus, disk shelf 132 is shown as being connected to the Pool 0 adapters via cabling 505 and 510. In such a mirroring configuration, an example of a miswired or improper configuration would be shown by cabling (dashed line) 515 which connects disk shelf 132 B connector to a storage adapter in Pool 1. Such a configuration violates the mirroring protocol utilized.

D. Configuration Verification

Figure 6:
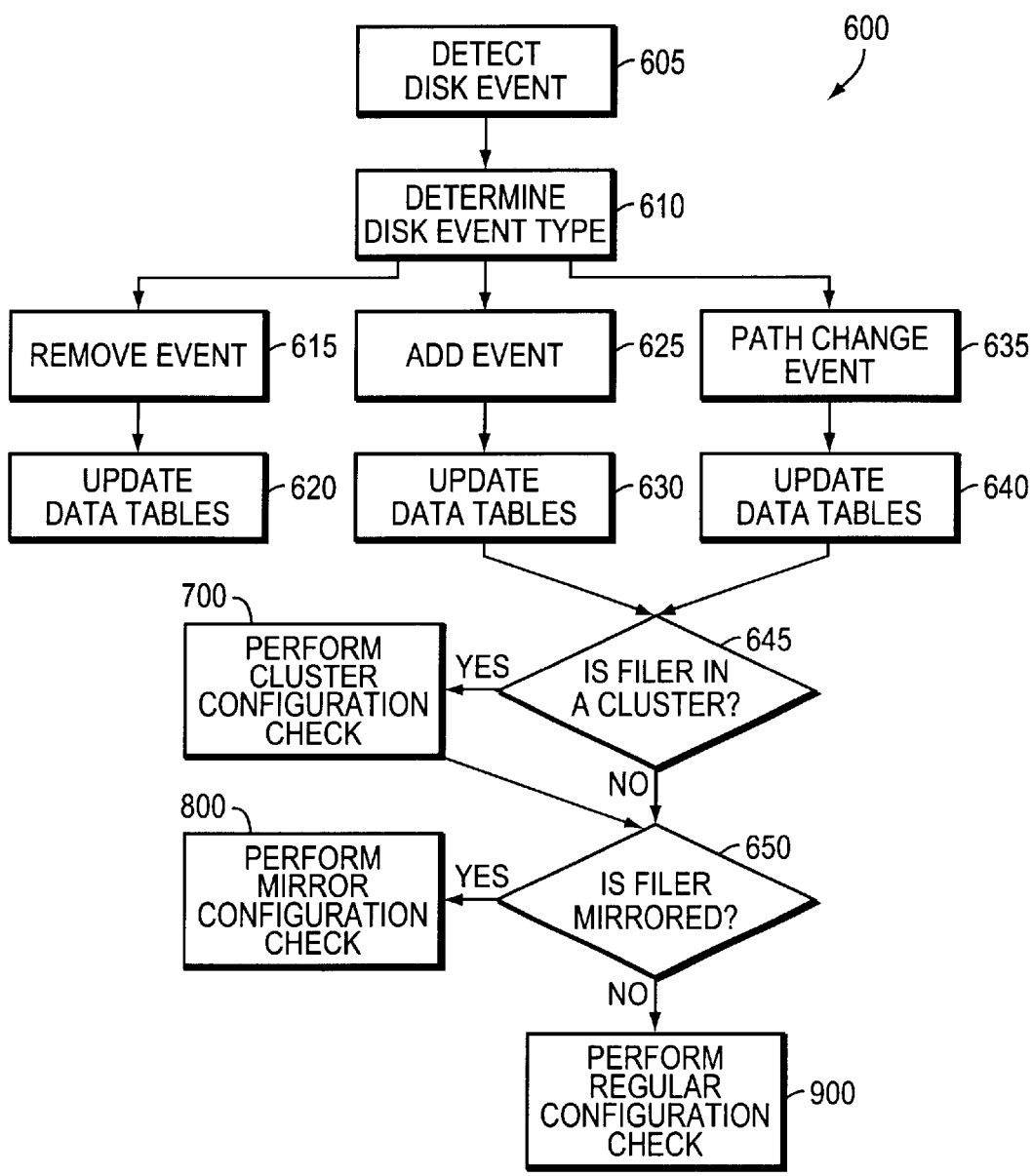
FIG. 6 is a flow chart detailing the procedure performed by the file server in performing a disk configuration verification in accordance with an illustrative embodiment of this invention.

The disk configuration verification layer 226 performs a configuration verification of the disks connected to a file server. This configuration verification occurs in real-time after any event that modifies the disk configuration. By "real-time" it is meant during the normal operation of the filer and in direct response to a given event. While the configuration verification will not begin immediately after the change in disk configuration due to time elapsing due to, e.g., task switching by the storage operating systems, the verification should begin promptly. Specifically, by real-time it is meant that the configuration verification does not occur at regular time intervals, but instead occurs in response to a detected change in the configuration during the runtime of the filer. By runtime it is meant during the course of normal operations of the filer. FIG. 6 is a flow chart of the procedure 600 performed by the storage operating system in verifying the disk configuration. In step 605, the layer detects a disk event. Such disk events are generated by changes in a disk configuration by, for example generating a fibre channel loop initialization event. Fibre Channel loop initialization events are described further in *Fibre Channel Arbitrated Loop* (FC-AL-2), published by the American National Standards Insitute, Inc., which is hereby incorporated by reference. This detection is accomplished by the fibre channel loop initialization event being generated and passed to the storage adapter. The low-level disk driver 232 (see FIG. 2) interprets the loop initialization event and passes the type of event and associated data to various other layers of the storage operating system, including the disk configuration verification layer 226. This disk event can be an ADD, REMOVE or PATH CHANGE event. By utilizing a loop initialization event to trigger the configuration verification, the need to scan all possible disk slots and bays is avoided. This results in improved performance of the verification process. Next, in step 610, the disk configuration verification layer determines which disk event type has occurred. This determination is made by analyzing, for example, the loop initialization event type generated by the change in disk configuration.

If it is a REMOVE event step 615, the disk configuration verification layer updates data tables in step 620. These data tables are utilized by the disk configuration verification layer to store the current disk configuration. Also, in alternate embodiments, this information may also be utilized for maintaining a table of paths to fibre channel devices. Such a multi-path use is described in U.S. patent application Ser. No. 10/092,007 entitled SYSTEM AND METHOD FOR MULTIPATH I/O SUPPORT FOR FIBRE CHANNEL DEVICES, by Anthony Aiello et al, which is hereby incorporated by reference. In response to a REMOVE event, the data tables are updated to reflect that a particular disk is no longer present. In the illustrative embodiment, no further action is performed by the disk configuration verification layer. In alternate embodiments, the disk configuration verification layer could perform the verification associated with the file server's environment, for example as a cluster (FIG. 7), as a mirroring file server (FIG. 8) or as a standard file server (FIG. 9).

If it is an ADD event step 625, the disk configuration verification layer updates data tables in step 630. Similarly, if it is a PATH CHANGE event (step 635), data tables are updated in step 640. These data table updates add the new disk or modify the path information in the respective configuration table. After an ADD or PATH CHANGE event and the corresponding update of data tables, the disk configuration verification layer then determines if the particular filer is in a cluster step 645. If the filer is in a cluster, the disk verification layer then performs a cluster configuration check step 700 described further below. The file server next checks to see if the filer is mirrored step 650. If the file server is mirrored, the disk verification configuration layer performs a mirror configuration check in step 800 described below. Otherwise, a disk configuration verification layer performs a regular configuration check in step 900 described below.

Figure 7:
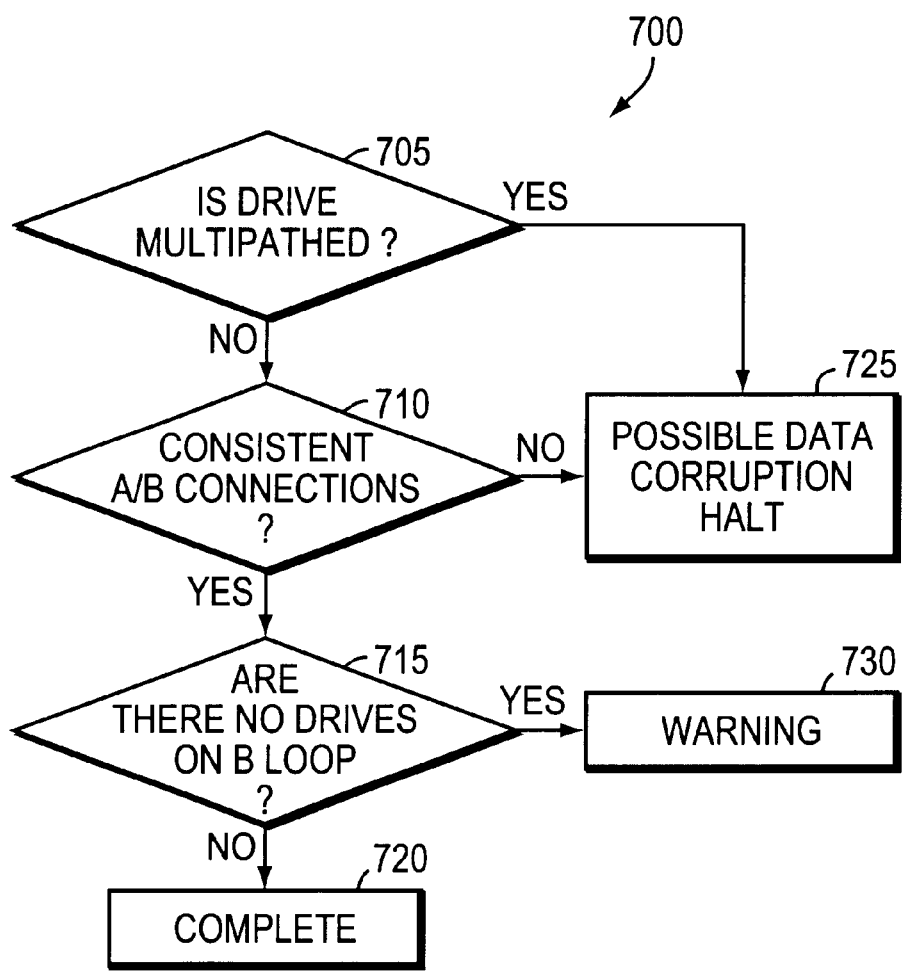
FIG. 7 is a flow chart of the procedure performed in verifying the configuration of disks in a file server cluster environment.

FIG. 7 is a flow chart detailing the procedure 700 that the disk verification layer performs in checking the configuration of a file server cluster. In step 705, the disk verification layer determines if the drive that is being added or having its path changed is a multi-path disk. By multi-path it is meant that both the A and B data connectors of the disk are connected to the same file server. This configuration violates the cluster definition as it does not provide for a data path from the file server's partner or failover file server. Next, in step 710, the disk configuration verification layer determines if the disk has a consistent A/B connection. An inconsistent A/B connection can occur, for example by wiring a disk in a disk shelf so that the disks A and B connectors are opposite of the disk shelves' A and B connectors. If the drive is multi-pathed or does not have a consistent A/B connection, possible data corruption can occur in a clustered file server environment. Thus, the disk configuration verification layer halts the file server to prevent this data corruption or loss. This halting of the file server is accompanied by, in certain embodiments of the invention, a message or warning to the system administrator or user alerting them of the possible data corruption and the reason for the file server halting.

If the drive is not multi-pathed and has a consistent A and B connection, the disk configuration verification layer then determines if the drive is connected to the B loop of the file server. If all drives found are on the A loop, i.e. there are no drives on the B loop then a warning (step 730) is issued to the system administrator or user. However, as this configuration does not result in possible data corruption, the file server is not halted. If the drive is not on the B loop the cluster configuration check is completed (step 720).

Figure 8:
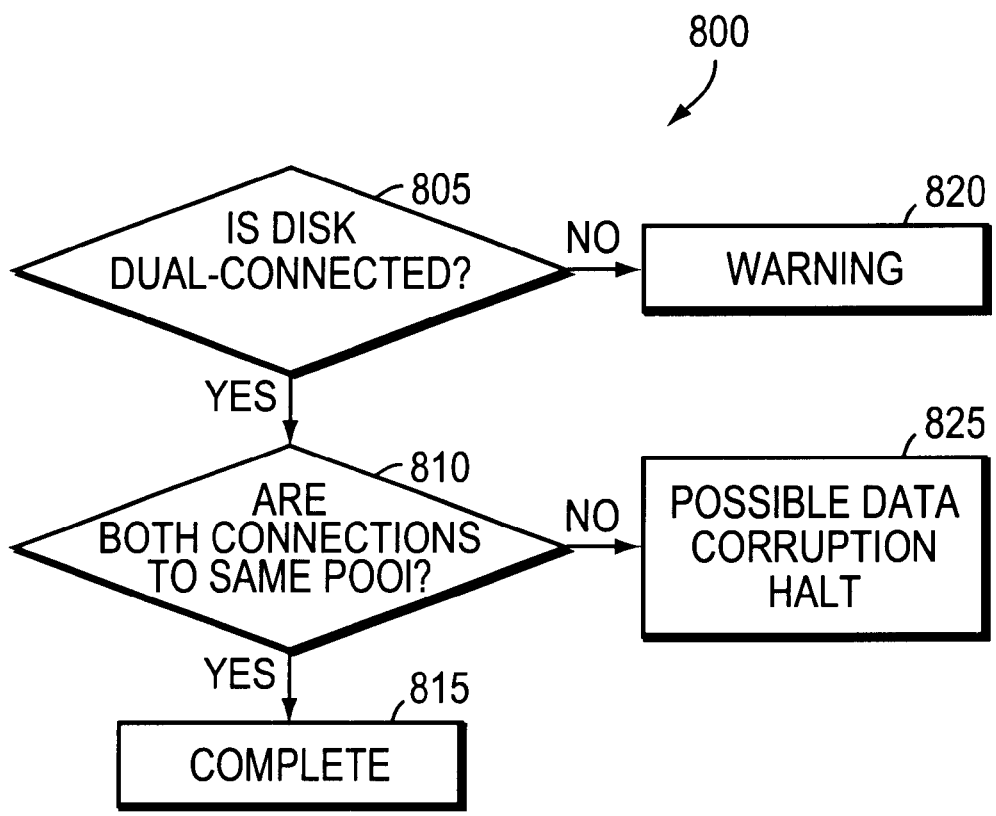
FIG. 8 is a flow chart of the procedure performed in verifying the configuration of disks in a mirroring environment.
Figure 9:
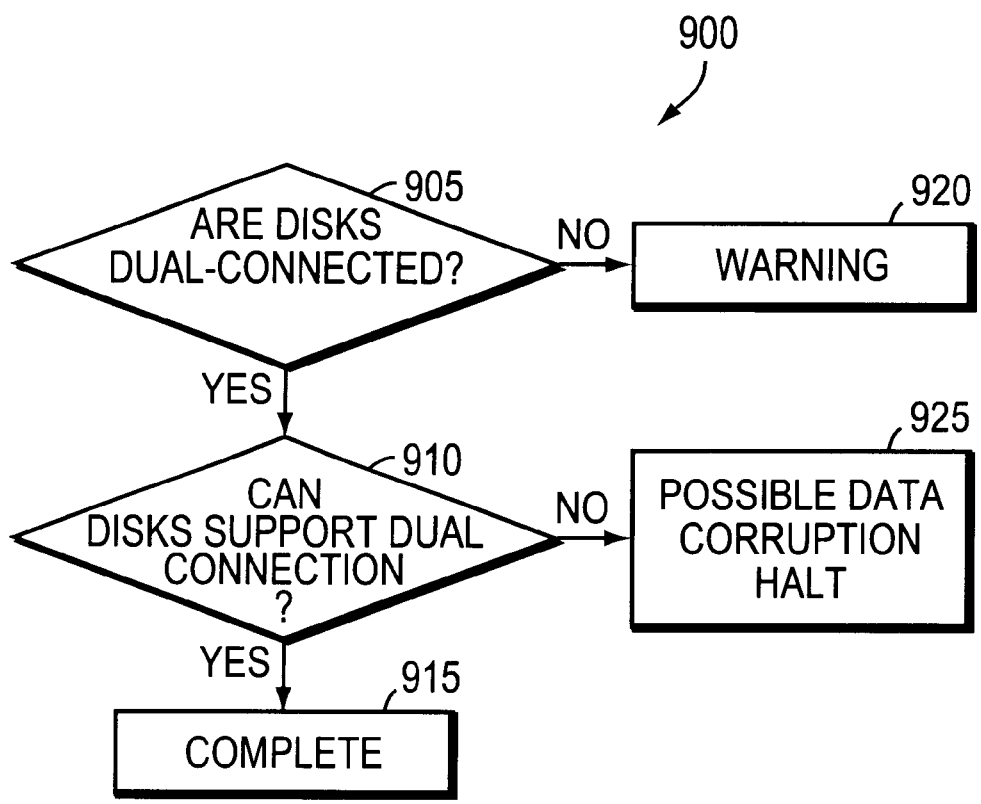
FIG. 9 is a flow chart of the procedure performed in verifying the configuration of disks in a standard file server environment.

FIG. 8 is a flow chart detailing the process that the disk verification configuration layer performs in checking the configuration of the file server in certain mirroring configurations. In steps 805, the disk configuration verification layer determines if the disk is dual-connected. This dual-connection means that both the disks A and B disk connections are connected to the file server. If the disk is not dual-connected, the system issues a warning (step 820) to the user or administrator. In step 810, the disk verification configuration layer determines if both the A and B connections are to the same pool of storage adapters on the file server. If both connections are to the same pool of storage adapters, the mirroring configuration is complete (step 815). If the A and B connectors of the disk are not connected to the same pool, the disk verification layer halts the system to prevent possible data corruption (step 825).

FIG. 9 is a flow chart detailing the process 900 performed by the disk configuration verification layer in verifying the configuration of a file server in regular operation. First, in step 905 if the disks are dual-connected, the disk configuration verification layer then determines if the disks can support the dual connection (step 910). If the disks are not dual-connected, the system issues a warning to the user or administrator (step 920). Some disk drive types cannot support being connected by both their A and B connectors. If the disks can support the dual connection, the configuration check is complete (step 915). If the drives do not support dual connections, but are dual-connected, the disk verification layer halts the system to prevent possible data corruption (step 925).

To again summarize, the disk verification configuration layer of a storage operating system forms a real-time verification of the configuration of disks connected to a file server. This verification of the configuration of disks is originated by a fibre channel loop initialization event. Upon receipt of a fibre channel loop initialization event, the disk configuration verification layer performs the indicated verification. By performing the verification in real-time and upon receipt of a loop initialization event, the disk configuration verification layer overcomes a known disadvantage of the prior art in that disk verification does not occur at stated time intervals. Thus, the time lag between a change in the disk configuration and the initialization of a verification of a disk configuration is de minimus. In particular, the time lag is only the small increment required for the disk verification layer to receive the loop initialization event and to perform a disk verification.

The foregoing has been a detailed description of an illustrative embodiment of the invention. Various modifications and additions can be made without departing from the spirit and scope of the invention. For example, it is understood that the various data structures can include fields and/or be generated or managed by differing layers of the storage operating system while remaining within the scope of the present invention. Additionally, while this description has been written in reference to filers and file servers, the principles are equally pertinent to all types of computers, including stand alone computers. Further, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for real-time verification of a configuration of a plurality of disks operatively interconnected with a computer, the method comprising the steps of:

detecting, during real-time operation of the computer, a change in the configuration in the plurality of disks;

comparing, in response to detection of a change in the configuration, the changed configuration of the plurality of disks with a set of rules; and generating, in response to the changed configuration violating the set of rules, an error condition.

2. The method of claim 1 wherein the error condition further comprises a warning message.

3. The method of claim 1 wherein the error condition further comprises a halting of the computer.

4. The method of claim 1 wherein the computer further comprises a file server.

5. The method of claim 1 wherein the step of detecting change in the configuration further comprises the step of detecting a fibre channel loop initialization event.

6. The method of claim 1 wherein the step of comparing the changed configuration with a set of rules further comprises the steps of:

determining if the plurality of disks are multi-pathed;

determining if the plurality of disks have a consistent connection to a disk access port;

determining if any of the plurality of disks are connected via second data port.

7. The method of claim 1 wherein the step of comparing the changed configuration with a set of rules further comprises the steps of:

determining if the plurality of disks are dual-connected; and determining if each of the plurality of disks can support a dual-connection.

8. A file server for use in a network storage system having a plurality of storage devices, the plurality of storage devices contained in a shelf arrangement having a plurality of slots for receiving storage devices, the file server performing a real-time verification of the storage devices, the file server comprising:

means for detecting, during real-time operation of the file server, a change in a configuration of the plurality of storage devices;

means for comparing, in response to a detected change in the configuration of the storage devices, the changed configuration with a set of rules;

means for generating, in response the changed configuration violating the set of rules, an error condition.

9. A method for verifying a configuration of a plurality of disks operatively interconnected with a computer, the method comprising the steps of:

verifying, in response to a change of the configuration of the plurality of disks during runtime of the computer, that the changed configuration satisfies a set of rules.

10. The method of claim 9 further comprising the step of alerting a user if the changed configuration does not satisfy the set of rules.

11. The method of claim 10 wherein the step of alerting the user further comprises the step of halting the computer.

12. The method of claim 1 wherein the step of alerting the user further comprises the step of displaying a warning message on a management station.

13. A computer for use with a plurality of storage devices operatively interconnected with the computer, the computer comprising:

a storage device verification layer, the storage device verification layer performing, in response to a change of a configuration of the plurality of storage devices, a real-time verification of the configuration of the plurality of storage devices.

14. A computer-readable medium, including program instructions executing on a computer, for verifying a configuration of storage devices operatively interconnected with the computer, the computer-readable medium including instructions for performing the steps of:

detecting, during real-time operation of the computer, a change in the configuration in the plurality of storage devices;

comparing the changed configuration of the plurality of storage devices with a set of rules; and generating, in response to the changed configuration not being in compliance with the set of rules, an error condition.

15. A method for real-time verification of configuration of storage devices operatively interconnected with a computer, the method comprising the steps of:

detecting, during runtime of the computer, a storage device event, updating, in response to the storage device event being a remove event, a set of data tables;

performing, in response to the storage device event type being an add event a storage device verification routine; and performing, in response to the storage device event type being a path change event, a disk verification routine.

16. The method of claim 15 wherein the storage device event is generated by a fibre channel loop initialization event.

17. The method of claim 15 wherein the disk verification routine further comprises the steps of:

determining if the computer comprises part of a cluster;

performing, in response to the computer comprising part of a cluster, a cluster clarification verification;

determining if the computer is mirroring the storage devices;

performing, in response to the computer mirroring the storage devices, a mirror configuration verification; and performing, in response to the computer not comprising a cluster and not mirroring the storage devices, a regular configuration verification.

18. The method of claim 17 wherein the step of performing a cluster configuration verification further comprises the steps of:

determining if any of the plurality of storage devices is multi-pathed;

determining if each of the storage devices includes a consistent data port connection;

determining if any of the plurality of storage devices is connected to a B data connector on a storage device.

19. A method for real-time verification of a configuration of a plurality of disks operatively interconnected with a computer, the disks configured in a shelf arrangement having a predetermined total number of available slots for operatively connecting disks, the method comprising the steps of:

comparing, in response to a detection of a change in the configuration of the plurality of disks, the changed configuration of the disks connected to each of a plurality of the available slots with a set of rules, the plurality of available slots being less in number than the predetermined total number of the available slots; and generating, in response to the changed configuration violating the set of rules, an error condition.

* * * * *